United States Patent [19]

Ting

[11] 4,078,350

[45] Mar. 14, 1978

[54] IMPACT RESISTANT WALL STRUCTURE

[75] Inventor: Raymond M. L. Ting, Pittsburgh, Pa.

[73] Assignee: H. H. Robertson Company, Pittsburgh, Pa.

[21] Appl. No.: 723,983

[22] Filed: Sep. 16, 1976

Related U.S. Application Data

[63] Continuation-in-part of Ser. No. 647,601, Jan. 8, 1976, abandoned.

[51] Int. Cl.$^2$ ............................................... E04B 2/52
[52] U.S. Cl. ........................................ 52/483; 52/336; 52/451; 52/486; 52/588; 52/618
[58] Field of Search ................. 52/381, 336, 483, 486, 52/451, 452, 588, 618, 625

[56] References Cited

U.S. PATENT DOCUMENTS

| 667,384 | 2/1901 | Brandt | 52/618 X |
|---|---|---|---|
| 944,592 | 12/1909 | Bonsall | 52/618 |
| 1,410,923 | 3/1922 | Johnston | 52/452 |
| 1,625,061 | 4/1927 | Trout | 52/618 X |
| 2,049,863 | 8/1936 | Palmer | 52/272 |
| 3,200,026 | 8/1965 | Brown | 52/596 X |
| 3,732,656 | 5/1973 | Robinsky | 52/625 X |

FOREIGN PATENT DOCUMENTS

| 37,308 | 5/1955 | Poland | 52/618 |
|---|---|---|---|
| 967,342 | 8/1964 | United Kingdom | 52/618 |

*Primary Examiner*—Alfred C. Perham
*Attorney, Agent, or Firm*—Harry B. Keck; George E. Manias

[57] ABSTRACT

An impact-resistant wall structure is fabricated from two types of sheet metal cellular panel units and concrete columns which are enclosed thereby. Inner sheet metal cellular panel units are secured to outboard members of a building framework. Outer sheet metal cellular panel units are secured outboard to the inner sheet metal cellular units with the cells of the inner units perpendicular to the cells of the outer units. The inner sheet metal cellular units cooperate with the outer sheet metal cellular units to provide total peripheral metal enclosure for concrete columns. The outer sheet metal cellular units are fastened to the inner sheet metal cellular units at contiguous points preferably by means of threaded fasteners which extend into the concrete columns. Reinforcing rods positioned within the cells of certain or all of the panel units provide increased tension reinforcement, increased shear resistance, and produce local damage to impacting missiles. A decorative sheathing may be applied outboard of the outer sheet metal cellular units, if desired.

10 Claims, 15 Drawing Figures

TORNADO WIND VELOCITIES CONSIDERED IN NUCLEAR POWER PLANT DESIGN

|  | REGION | | |
|---|---|---|---|
|  | 1 | 2 | 3 |
| Tangential Velocity (mph) | 290 | 240 | 190 |
| Translational Velocity (mph) | 70 | 60 | 50 |
| Maximum Velocity (mph) | 360 | 300 | 240 |

Fig. 1

TORNADO WIND VELOCITIES CONSIDERED IN NUCLEAR POWER PLANT DESIGN

|  | REGION | | |
| --- | --- | --- | --- |
|  | 1 | 2 | 3 |
| Tangential Velocity (mph) | 290 | 240 | 190 |
| Translational Velocity (mph) | 70 | 60 | 50 |
| Maximum Velocity (mph) | 360 | 300 | 240 |

Fig. 2

ANTICIPATED MISSILE TYPES

| A - Wood Plank | 4" x 12" x 12' long |
| --- | --- |
| B - Steel Pipe | 3" O.D., 10' long, Schedule 40 |
| C - Steel Rod | 1" O.D. x 3' long |
| D - Steel Pipe | 6" O.D., 15' long, Schedule 40 |
| E - Steel Pipe | 12" O.D., 15' long, Schedule 40 |
| F - Utility Pole | 13.5" O.D. x 35' long |
| G - Automobile | 20 sq. ft. frontal area |

Fig. 3

ANTICIPATED MAXIMUM MISSILE VELOCITIES

| Missile | Weight (lbs.) | Missile Velocity (mph) | | |
| --- | --- | --- | --- | --- |
| | | Region 1 | Region 2 | Region 3 |
| A | 200 | 288 | 240 | 192 |
| B | 78 | 144 | 120 | 96 |
| C | 8 | 216 | 180 | 144 |
| D | 285 | 144 | 120 | 96 |
| E | 743 | 144 | 120 | 96 |
| F | 1490 | 144 | 120 | 96 |
| G | 4000 | 72 | 60 | 48 |

IMPACT RESISTANT WALL STRUCTURE

CROSS-REFERENCES TO RELATED APPLICATIONS

This application is a continuation-in-part of copending application Ser. No. 647,601 filed Jan. 8, 1976 now abandoned.

BACKGROUND OF THE INVENTION

1. Field of the Invention

An impact-resistant wall structure fabricated from sheet metal cellular panel units and concrete.

2. Description of the Prior Art

The customary impact-resistant wall structures are fabricated from reinforced concrete monolithic blocks whose thickness is established according to the anticipated impact exposure. Such reinforced concrete walls are not only expensive from a materials standpoint, but also are heavy and space consuming.

Impact-resistant walls have been fabricated from armor plate steel of substantial thickness. Such armor plate steel walls are objectionable because of the cost, the weight and the difficulty of installation.

Sheet metal cellular units for use in building construction are well known. The use of such sheet metal cellular units in combination with concrete for producing building floors is well known. The use of such sheet metal cellular units in combination with concrete to produce walls also is known. See U.S. Pat. Nos. 2,049,863; 2,200,636. However sheet metal cellular units of the prior art have not been empoyled as herein described in the fabrication of impact-resistant walls in combination with concrete.

SUMMARY OF THE INVENTION

It has been determined that the continental United States has three distinct regions in which tornadoes of different maximum intensities can occur. According to that determination, Region 1 of the United States has the most severe tornadoes, whereas Region 3 of the United States has the least severe tornadoes.

The principal object of the invention is to produce an impact-resistant wall of relatively light weight in comparison to the impact-resistant walls of the prior art.

A further object of the invention is to produce an impact-resistant wall having predictable and reproducible impact resistance.

Another object of this invention is to produce impact-resistant walls capable of stopping all anticipated missiles.

An impact-resistant wall capable of resisting all anticipated missiles in Region 3 and most anticipated missiles in Regions 1 and 2 may be fabricated from:

a steel framework of structural columns and beams (or girders);

an inner sheet metal sheathing connected to outboard members of the framework and fabricated from sheet metal cellular units;

an outer sheet metal sheathing, secured to the inner sheet metal sheathing and fabricated from sheet metal cellular units;

the inner sheathing having primary cells extend vertically and the outer sheathing parallel cells extend horizontally;

the outer sheathing cooperates with the flutes of the inner sheathing to form vertical secondary cells interposed between the vertical primary cells of the inner sheathing; and concrete fills the primary cells of the inner sheathing and also fills the secondary cells formed by the outer sheathing and the flutes of the inner sheathing.

The above described impact-resistant wall, adapted to resist penetration of all anticipated missiles in Regions 2 and 3 and most anticipated missiles in Region 1 additionally includes:

first reinforcing members, each extending transversely through aligned openings in the side walls of the cellular units of the inner sheathing and through the primary and secondary cells; and second reinforcing members disposed within and extend vertically through certain of the vertical cells. The first reinforcing members are vertically spaced-apart and generally parallel with each other. The second reinforcing members preferably extend through the primary cells. Each of the primary cells preferably is provided with a pair of the second reinforcing members.

The above described reinforced wall, adapted to resist penetration of all anticipated missiles in Regions 1, 2 and 3, further includes:

third reinforcing members disposed within and extending through the horizontally extending parallel cells of the outer sheathing. Preferably each of the parallel cells receives a pair of the third reinforcing members.

BRIEF DESCRIPTION OF THE DRAWINGS

FIG. 1 is a chart summarizing the tornado wind velocities considered in nuclear power plant design;

FIG. 2 is a list of anticipated missile types;

FIG. 3 is a chart summarizing the anticipated maximum velocities of the missiles identified in FIG. 2;

DESCRIPTION OF THE PREFERRED EMBODIMENTS

Introduction

Weather phenomena of different types and of varying intensities are known throughout the world. The continental United States experiences tornadoes of varying intensities. It has been determined that the continental United States has three distinct regions in which tornadoes of different maximum intensities can occur. Those properties of tornadoes which must be considered in the design of nuclear power plants have been identified. These properties and their maximum anticipated value in each of the three regions are indicated in FIG. 1. For a detailed discussion of these properties, their significance in the design of nuclear power plants, and identification of the aforesaid three regions of the continental United States, reference is directed to "Design Basis Tornado for Nuclear Power Plants," Regulatory Guide 1.76, *U.S. Nuclear Regulatory Commission* (1974).

Numerous types of anticipated missiles and their probable physical dimensions have been indentified. The maximum anticipated missile velocities in each of the three regions also have been determined. Those anticipated missiles which are of concern in the design of nuclear power plants are identified in FIG. 2. The anticipated maximum velocity of each missile identified in FIG. 2 for each of the three regions are indicated in FIG. 3. For additional information concerning the data of FIGS. 2 and 3, reference is directed to Section 3.5.1.4 entitled "Missiles Generated by Natural Phenomena," appearing in Standard Review Plan, published in 1975 by the U.S. Nuclear Regulatory Commission.

FIGS. 4 through 10 illustrate an impact-resistant wall capable of resisting (a) all missiles (FIG. 2) traveling at the anticipated maximum velocities (FIG. 3) in Region 3; and (b) most missiles (FIG. 2) traveling at the anticipated maximum velocities (FIG. 3) in Regions 1 and 2.

Figure 4:
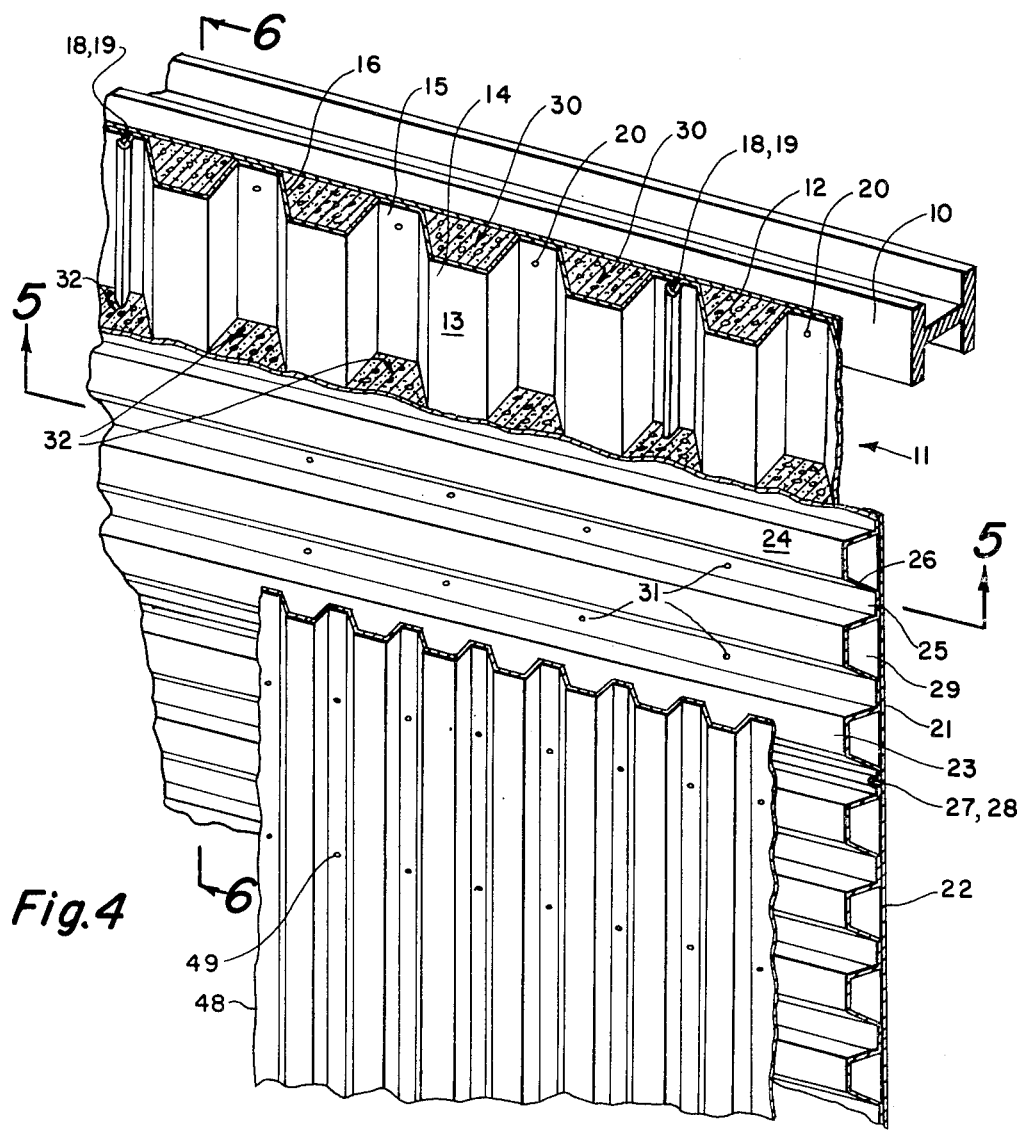
FIG. 4 is a fragmentary perspective illustration of one embodiment of an impact-resistant wall according to this invention.
Figure 5:
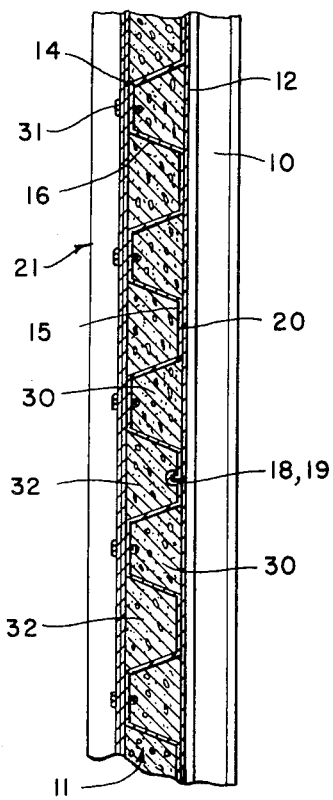
FIG. 5 and FIG. 6 are fragmentary sectional illustrations taken along the lines 5—5 and 6—6 of FIG. 4.
Figure 6:
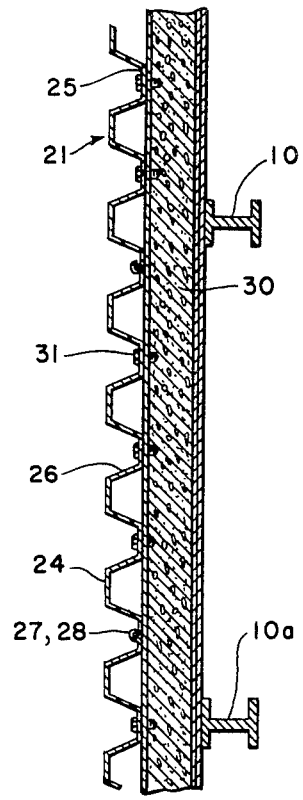

As shown in FIGS. 4, 5 and 6, the present wall is fabricated on horizontal building girts 10, 10a which are connected to vertical structural columns (not shown).

The Inner Sheathing Panels

Figure 9:
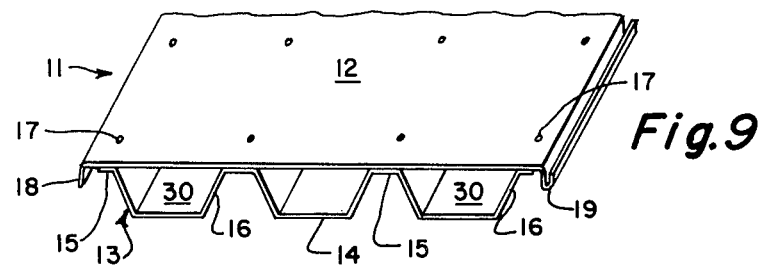

Spanning the horizontal girts 10 and secured outboard thereof are sheet metal cellular units 11 which constitute an inner sheathing for the impact-resistant wall. The sheet metal cellular units 11 are fabricated from a flat metal sheet 12 and a corruguated metal sheet 13 as more clearly illustrated in FIG. 9. The corrugated sheet 13 includes crests 14, valleys 15, sloping webs 16. The corrugated sheet 13 is joined to the flat sheet 12 by means of welds 17 which connect the valleys 15 with the contiguous portions of the flat sheet 12. The sheet metal cellular units 11 have parallel cells 30 defined by a crest 14, the two adjoining sloping webs 16 and the contiguous portion of the flat sheet 12. Lateral connecting members are provided in the cellular sheet metal unit 11. As shown in FIG. 9 the lateral connecting members include a male lip 18 and a female lip 19 which are formed along the side of the flat sheet 12. These lateral connecting members permit the assembly of multiple units 11 in side-by-side connected relationship.

The sheet metal cellular units 11 are secured to the horizontal girts 10, 10a by means of welds 20 through the valley portions 15 of the corrugated sheet 13. Alternatively, the sheet metal cellular units 11 may be secured to the horizontal girts 10, 10a by means of metal bolts extended through the valleys 15 and the girts 10, 10a; or by means of metal screws passing through the valleys 15 and the girts 10, 10a; or by means of fillet welds connecting the edges of the girts 10, 10a with the inner surface of the flat sheets 12.

The number of units 11 is sufficient to span the area where an impact-resistant wall is desired. It will be understood that multiple parallel horizontal girts 10, 10a are normally provided. The sheet metal cellular units 11 span the distance between two or more of the horizontal girts 10, 10a.

The Outer Sheathing Panels

After all of the inner sheet metal cellular units 11 have been secured to the steel framework of the building, an outer sheathing is applied. The outer sheathing is formed from sheet metal cellular units 21 which are formed (similarly to the sheet metal elements 11) from a flat metal sheet 22 and a corrugated metal sheet 23. The corrugated sheet 23 has crests 24, valleys 25 and sloping webs 26. The sheet metal cellular units 11 have parallel cells 29 defined by a crest 24, the two adjoining sloping webs 26 and the contiguous portion of the flat sheet 22. Each of the sheet metal cellular units 21 has lateral connecting means 27, 28 to facilitate the side-by-side joining of the units 21. The cellular units 21 are installed with their cells 29 extending perpendicularly to the direction of the cells 30 of the inner cellular units 11. The outer cellular units 21 are secured to the inner cellular units 11 by means of connections between the valleys 25 (of the units 21) and the crests 13 (of the units 11). The connection may be accomplished by means of welds but is preferably accomplished by means of metal screws 31 which extend through the valleys 25 and through the crests 13 into the cells 30.

After the outer cellular units 21 have been secured in position, the flat sheets 22 combine with the sloping webs 16 and the valleys 15 (of the units 11) to form additional vertical cells 32 which are entirely surrounded by sheet metal along their length. The vertical cells 32 are characterized as secondary cells to distinguish them from the vertical cells 30 which are characterized as primary cells.

Concrete

After the outer cellular units 21 have been installed, the vertical cells 30, 32 are filled with concrete which is poured at the job site. Within the cells 30, the concrete surrounds and engages the threaded portions of the fastening screws 31. This connection between the screws 31 and the concrete within the cells 30 improves the bonding of the outer sheet metal cellular units 21 to the overall wall structure.

Alternative Embodiments

Figures 7, 8:
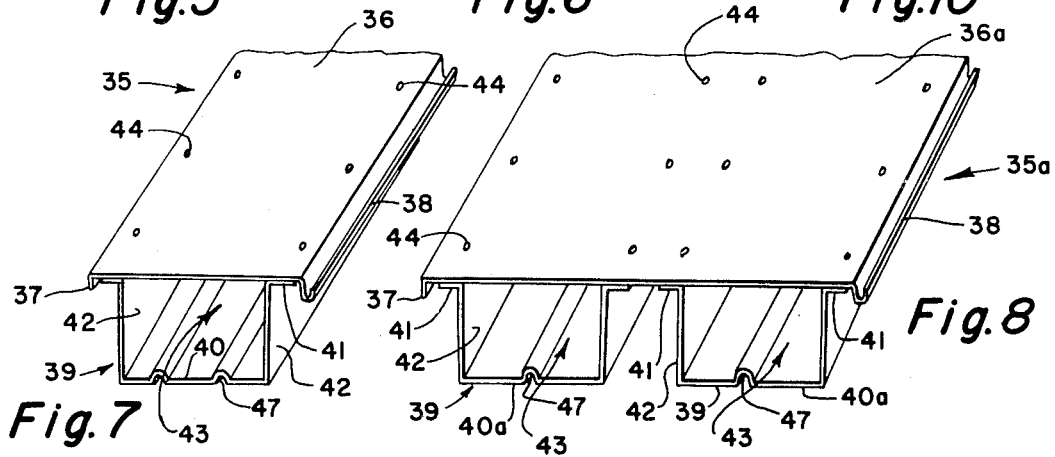
FIGS. 7, 8 and 9 are fragmentary perspective illustrations of typical sheet metal cellular units which are useful in constructing the impact-resistant wall of this invention.

Sheet metal cellular units of the type illustrated in FIGS. 7 and 8 are well known in the art. These units 35, 35a include an essentially flat sheet 36, 36a with lateral connecting means 37, 38, and one or more hat sections 39, each having a crest 40, 40a, outwardly extended flanges 41 and connecting webs 42. One or more reinforcing ribs 47 may be provided in the crests 40, 40a to stiffen the units. The hat section 39 combines with the flat sheet 36 to form a lengthwise cell 43. In some embodiments, FIG. 7, the flat element 36 has a single hat section 39. In other embodiments, FIG. 8, the flat element 36a accommodates two hat section elements 39. The hat sections 39 are secured to the flat members 36, 36a by means of welds 44 at spaced locations along the flanges 41.

Figure 10:
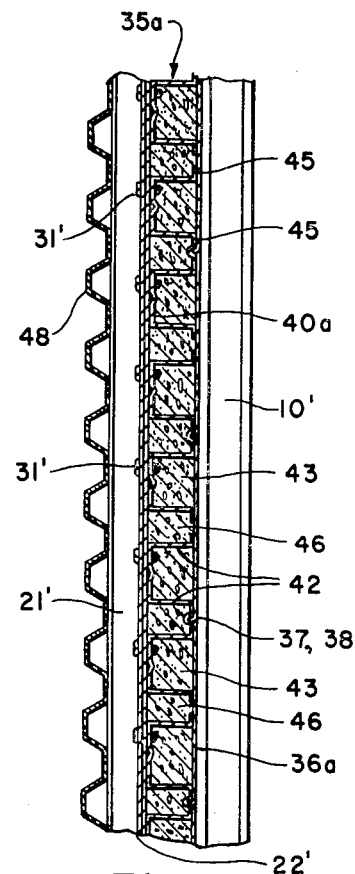
FIG. 10 is a cross-sectional illustration, similar to FIG. 5, illustrating an impact-resistant wall employing the sheet metal cellular units of FIG. 8.
Figure 11:
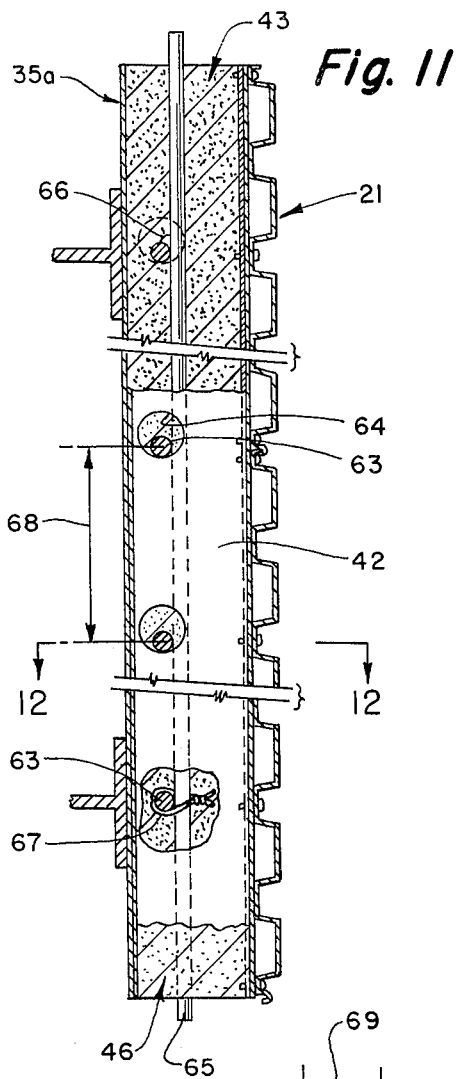
FIG. 11 is a vertical cross-sectional view taken substantially along the line 11—11 of FIG. 12 illustrating another embodiment of the present impact-resistant wall.
Figure 12:
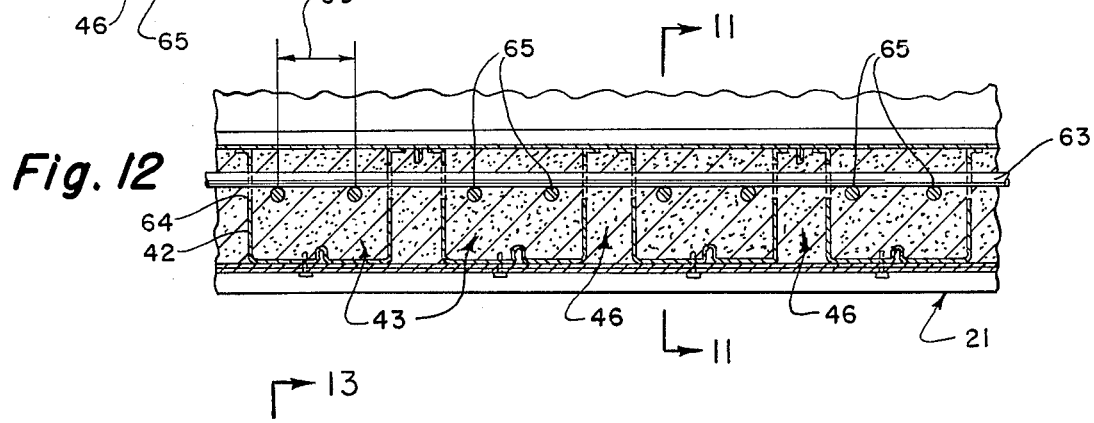
FIG. 12 is a cross-sectional view, taken along the line 12—12 of FIG. 11.

The sheet metal cellular units of the type shown in FIG. 8 can be empolyed in the present impact-resistant wall structures as shown in FIG. 10 wherein a horizontal girt 10' is a part of the building framework. The sheet metal cellular units 35a are secured to the horizontal girt 10' by means of spaced welds 45 extending through the flanges 41, through the flat sheet 36a into the flanges of the horizontal girt 10'. As an alternative to the spaced welds, the sheet metal cellular units 35a may be secured to the girts 10' by means bolts; or by means of metal screws; or by means of fillet welds joining the girts 10' to the flat sheets 36a. Outer sheet metal cellular units 21' are secured to the inner sheet metal cellular units 35a by means of fasteners 31' extending through the valleys 25 and flat sheet 22' (of the units 21') and through the crest 40a (of the units 35a) into the vertical cells 43. It will be observed that the flat sheets 22' (of the units 21') combine with the vertical webs 42 of the inner sheet metal cellular units 35a to form enclosed vertical cells 46 which are interposed between the vertical cells 43. The cells 46 are called secondary cells herein to distinguish them from the primary cells 43. After the appropriate area of the building framework has been sheathed with the inner and outer sheet metal cellular units as shown in FIG. 10, concrete is poured into the cells 43, 46 and allowed to harden. FIGS. 11 and 12 illustrate an impact-resistant wall capable of resisting (a) all missiles (FIG. 2) traveling at the anticipated maximum velocities (FIG. 3) in Regions 2 and 3; and (b) most missiles (FIG. 2) traveling at the anticipated maximum velocities (FIG. 3) in Region 1.

As shown in FIGS. 11 and 12, the present impact-resistant wall structure incorporates vertically extending sheet metal cellular units 25a which constitute the inner sheathing, and horizontally extending sheet metal cellular units 21 which constitute the outer sheathing. In accordance with this embodiment, first reinforcing members 63 are provided, each extending transversely through aligned openings 64 in the side walls 42 of the inner cellular units 35a. The first reinforcing members 63 extend tranversely through the primary and secondary cells 43, 46, respectively. As best shown in FIG. 11, the first reinforcing members are vertically spaced-apart and generally parallel with each other. Second reinforcing members 65 are provided which are disposed within and extend vertically through certain of the cells. The second reinforcing members 65 preferably are provided within the primary cells 43. When initially installed, each of the second reinforcing members 65 may be secured to or connected to the first reinforcing members 63 which are adjacent to the upper and lower ends of the cellular units 35. As shown in FIG. 11, the second reinforcing member 65 may be connected to the first reinforcing member 63 by a tack weld 66 (see uppermost reinforcing member 63) or by wiring 67 (see lowermost reinforcing member 63).

The first reinforcing members 63 serve to distribute an impact load laterally across the wall. The vertically extending second reinforcing members 65 provide increased tension reinforcement for the primary cells 43; and also provide increased resistance to shear forces applied to the wall by an impacting missile. The first reinforcing members may consist of number 8 reinforcing elements having a one inch nominal outer diameter. The horizontal first reinforcing members are positioned at a typical center-to-center distance indicated at 68 in FIG. 11 of about 1 foot. The vertically extending second reinforcing member 65 may consist of number 6 reinforcing bars having a three-quarter inch nominal outer diameter. As best shown in FIG. 12, the second reinforcing members 65 preferably are provided within the primary cells 43 and are spaced-apart at a center-to-center distance indicated at 69 of about five inches.

It will further be observed in FIG. 11 that the aligned openings 64 have an inner diameter which is considerably greater than the outer diameter of the reinforcing members 63 passing therethrough. The aligned openings 64 typically have an inner diameter of about three inches. The aligned openings 64 have a relatively large inner diameter to insure passage of the concrete therethrough between the primary and secondary cells 43, 46.

Figure 13:
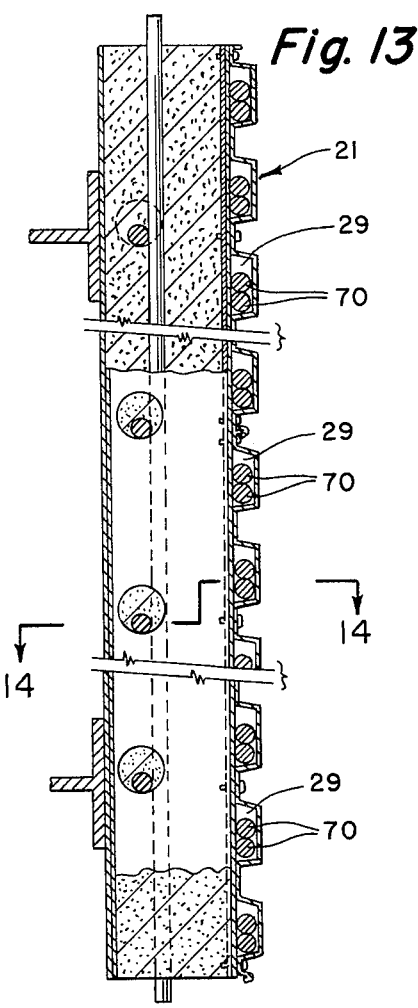
FIG. 13 is a vertical cross-sectional view taken substantially along the line 13—13 of FIG. 14, illustrating a further embodiment of the present impact-resistant wall.
Figure 14:
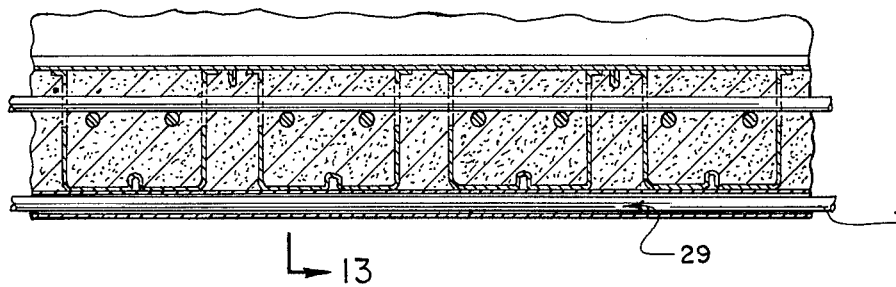
FIG. 14 is a cross-sectional view, taken along the line 14—14 of FIG. 13.

An impact-resistant wall capable of resisting all of the missiles (FIG. 2) traveling at the anticipated maximum velocities (FIG. 3) in each of the Regions 1, 2 and 3 is illustrated in FIGS. 13 and 14.

As shown in FIGS. 13 and 14, the horizontally extending parallel cells 29 of the outer cellular units 21 are provided with plural third reinforcing members 70. Preferably, each of the cells 29 is provided with a pair of the third reinforcing members 70. The third reinforcing members 70 serve two functions. Firstly, they provide increased resistance to shear forces applied to the wall structure by an impacting missile. Secondly, they produce local damage to the end of a missile, particularly to the end of a large diameter steel pipe. The local damage manifests itself in several ways. For example, the end of the impacting pipe may be splayed outwardly thereby distributing the impact load over a greater area of the wall structure. The third reinforcing members 70 also blunt the relatively sharp edge of the steel pipe thereby reducing the penetrating capability thereof. The local damage may also manifest itself by bending the pipe end inwardly whereby the pipe presents a blunt end to the wall structure which likewise reduces the penetrating capability of the pipe. The third reinforcing member 70 may consist of a number 9 reinforcing bar having a 1⅛ inch nominal outer diameter or a number 10 reinforcing member having a 1¼ inch nominal outer diameter. The third reinforcing member 70 preferably comprises a number 10 reinforcing member thereby satisfying the impact resistance for Regions 1 and 2.

Outer Decoration

If desired, the exterior surface of the resulting impact-resistant walls can be covered with a weather-resistant aesthetically attractive sheathing in the form of flat or corrugated painted metal sheets 48 (FIG. 4) or other cladding materials. The metal sheets 48 are secured to the crests 24 (of the units 21) by means of screws 49 or poprivets. It is feasible to have the outer sheet metal cellular units 21 (and 21') fabricated from a corrugated element 13 which is provided with a weather-resistant decorative coating, e.g., paint. The additional outer decorative sheathing (FIG. 4) supplies vertically extending flutes which can be compatible with the vertically extended weather-resisting decorative siding in other portions of the resulting building.

Test Results

A typical impact-resistant wall was assembled in the manner illustrated in FIG. 10 using as the inner sheathing the sheet metal cellular units of FIG. 8. The flat sheet 36a was fabricated from 13 gauge cold-rolled steel. The hat sections 39 were fabricated from 13 gauge cold-rolled steel. The flat section 36a had a width of 24 inches. The hat sections 39 had a depth (the space between the flat sheet 36a and the crests 40) of 7.6 inches. The width of the hat sections (between the webs 42) was 9 inches.

The outer sheet metal cellular units 21 were fabricated from 12 gauge cold-rolled steel. The flat sheet 22 was 24 inches wide. The corrugated sheet 23 had a height (between the flat sheet 22 and the crest surface 24) of 1.6 inches. Each of the outer sheet metal cellular units 21 contained four cells, i.e., each of the corrugated sheets 23 contained four crests 24.

The outer units 21 were secured to the inner units 35a by means of No. 14 screws, 2.5 inches long, spaced-apart 12 inches on center horizontally. The fastening screws 31' were positioned in the central valley 25 and in each lateral valley on each side of the joint forming elements 27, 28.

Figure 15:
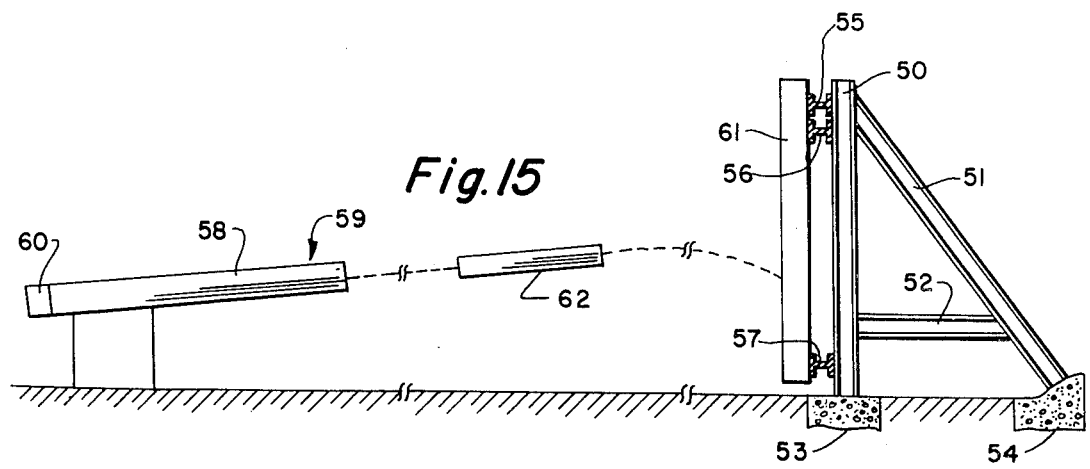
FIG. 15 is a schematic illustration of a test installation which was employed to evaluate the performance of the present impact-resistant wall construction.

A supporting frame was fabricated as shown in FIG. 15 from two vertical columns 50 (W14×78), two inclined bracing members 51 (W14×78) and two intermediate horizontal bracing members 52 (W10×45). The two vertical frame members 50 were 6 feet apart and were buried in a block 53 of concrete. The inclined support members also were buried in a block 54 of concrete. The vertical members 50 were 12 feet high. Secured to the forward surface of the vertical members 50 were three horizontal girts 55, 56, 57 (W14×53). The center-to-center spacing between girts 56, 57 was 10 feet. The center-to-center spacing between girts 55, 56 was 14 inches. The inner sheet metal cellular units were welded to the horizontal girts 56, 57. The wall structure was not connected to the top girt 55 which is included in the test frame for other tests of other materials. Hence the wall structure spanned 10 feet between the girts 56, 57. The vertical cells 43, 46 were filled with nominal 3000 psi concrete. The concrete, under actual test, exhibited compressive strengths of 4460 psi and 4350 psi on the day of the test. The test frame wall 61 included five sheet metal cellular units 35a, each 2 feet wide and each containing two hat sections 39.

To conduct the tests, a projectile launching tube 58 was assembled from a 16-inch o.d. pipe (wall thickness 0.844 inch), 39 feet, 8 inches long. The tube 58 had its open forward end 59 located 70 feet away from the wall structure 61. The launching tube constitutes a "gun" operating on the high-low pressure principle. A propellant is ignited in a high pressure chamber 60 and after a high pressure is developed, a diaphragm ruptures in the chamber allowing propellant gas at high pressures to flow through an orifice into the tube 58. A missile 62 in the test was a utility pole weighing 1300 pounds and having a butt end diameter of 14.1 inches and a length of 31.7 feet. The utility pole impact velocity was 141 miles per hour. The missile 62 impacted the wall 61 midway between the two horizontal girts 56, 57 of the test frame. The butt end of the pole was the impacting end of the pole.

Test results showed that the first 13 feet of the utility pole were crushed and splintered and an additional 5 feet of the pole length were damaged. The back of the test wall bulged out 1.5 inches behind the pole impact point after the test. The crests of the outer sheet metal cellular units were crushed in the region of the pole impact but no other damage was observed.

The concrete employed in the test had a density of 145 pounds per cubic foot.

The exterior decorative facing material was 22 gauge protected metal in a corrugated profile. The test wall had a dead weight of 113.3 pounds per square foot of wall area.

A reinforced concrete wall adequate to resist the impact of the test described in FIG. 10 would have a thickness of 24 inches and a weight of 300 pounds per square foot of area. The cost of the wall illustrated in FIG. 10 has been estimated at 30 to 45 percent of the cost of a comparable (in impact resistance) reinforced concrete wall.

I claim:

1. A wall construction including two horizontally presented, vertically spaced-apart parallel girts, an inner cellular panel spanning the vertical distance between the said parallel girts, said inner cellular panel being formed from
a first flat metal sheet and
at least one metal channel,
said channel having a crest, two side walls and two parallel flanges, said flanges being secured to the said first flat metal sheet, and
including lateral connecting means along the opposed vertical sides of the inner cellular panel connecting each such panel side-by-side with another such panel, said first flat metal sheet being secured to each of the said parallel girts, outboard thereof;

said inner cellular panel having vertical primary cells defined by the said crest and two adjoining side walls of the said channel and the portion of the said first flat metal sheet between the said two side walls;

an outer cellular panel secured to the said crests of the said inner cellular panel, said outer cellular panel being formed from a second flat sheet metal sheet and a corrugated metal sheet having alternating crests and valleys separated by side walls, said valleys being secured to the said second flat metal sheet; lateral connecting means along opposed horizontal sides of the said outer cellular panel for securing one such panel side-by-side with another such panel, each said outer cellular panel having plural horizontally extending, parallel cells, each formed by (a) a portion of the said second flat sheet between the valleys of the said corrugated sheet and (b) the overlying crest and adjoining side walls; said outer cellular panels being secured outboard to the said inner cellular panels by means of connections joining said valleys of the outer cellular panel, the said second flat sheets, and the crests of the said inner cellular panel;

said outer cellular panels combining with said inner cellular panels to form vertical secondary cells interposed between said primary cells and defined by (a) the two confronting side walls connected to adjacent crests of the said inner cellular panel, (b) the portion of the said inner cellular panel connecting the said two confronting side walls and (c) the portion of the said second flat sheet spanning the outboard edges of the said two confronting side walls;

concrete substantially entirely filling the said primary cells of the said inner cellular panel and substantially entirely filling the said secondary cells.

2. A wall construction according to claim 1 wherein the said outer cellular panels are secured to the said inner cellular panels by means of fasteners extending through the said valleys of the outer cellular panel, through the said second flat sheets of the outer cellular panel and through the crests of the said inner cellular panel and into the interior of the primary cells of the cells of the said inner cellular panel;

the said fasteners being embedded in the concrete within the said primary cells.

3. A wall construction according to claim 1 wherein the said inner cellular panel comprises the said first flat metal sheet and a second corrugated metal sheet including multiple crests and valleys joined together by side walls, said corrugated sheet being secured to said first flat metal sheet by means of welds extending between the said valleys and the said first flat metal sheet.

4. A wall construction according to claim 1 wherein a decorative weather-resistant outer sheet is secured directly to the said outer cellular panels in outboard relation thereto.

5. The wall structure according to claim 1 including:
first reinforcing members, each extending transversely through aligned openings in said side walls of said inner cellular panel and through the primary and secondary cells, said first reinforcing members being vertically spaced-apart and generally parallel with each other, and second reinforcing members disposed within and extending vertically through certain of said cells.

6. The wall structure according to claim 5 wherein said second reinforcing members are provided in said primary cells.

7. The wall structure according to claim 5 wherein each of said primary cells is provided with a pair of said second reinforcing members.

8. The wall structure according to claim 5 including third reinforcing members disposed within and extending through said horizontally extending, parallel cells of said outer cellular panel.

9. The wall structure according to claim 8 wherein each of said horizontally extending, parallel cells is provided with a pair of said third reinforcing members.

10. The wall structure according to claim 9 wherein the nominal outer diameter of said third reinforcing members is greater than that of said first reinforcing members and that of said second reinforcing members.

* * * * *